United States Patent
Chaudoir

Patent Number: 5,365,039
Date of Patent: Nov. 15, 1994

[54] HUMIDITY CONTROLLED FOOD WARMER

[75] Inventor: Roderick J. Chaudoir, Fox Point, Wis.

[73] Assignee: Hatco Corporation, Milwaukee, Wis.

[21] Appl. No.: 917,507

[22] Filed: Jul. 21, 1992

[51] Int. Cl.[5] ............................................. A21B 1/00
[52] U.S. Cl. ................................ 219/401; 99/468
[58] Field of Search ............ 219/401, 400; 392/399; 99/468, 331–333; 34/46, 54; 126/20.2, 21 A, 21 R; 312/236; 422/26, 109, 116, 295

[56] References Cited

U.S. PATENT DOCUMENTS

| | | | |
|---|---|---|---|
| 1,315,517 | 9/1919 | Krick | 34/46 |
| 1,863,943 | 6/1932 | Rubin | 34/46 |
| 2,499,525 | 3/1950 | Person . | |
| 2,552,387 | 5/1951 | Whinery | 34/46 |
| 2,606,372 | 8/1952 | Foulder et al. | 34/46 |
| 3,171,473 | 3/1965 | Lawler | 219/401 |
| 3,424,231 | 1/1969 | Truhan . | |
| 3,614,074 | 10/1971 | Wellford, Jr. | 34/46 |
| 3,744,474 | 7/1973 | Shaw | 219/401 |
| 4,010,349 | 3/1977 | Lee . | |
| 4,039,776 | 8/1977 | Roderick . | |
| 4,058,635 | 11/1977 | Durth | 426/509 |
| 4,238,447 | 12/1980 | Wolff | 422/26 |
| 4,373,430 | 2/1983 | Allen . | |
| 4,395,383 | 7/1983 | Kackos | 422/26 |
| 4,426,923 | 1/1984 | Ohata . | |
| 4,483,243 | 11/1984 | Cote . | |
| 4,623,780 | 11/1986 | Shelton . | |
| 4,674,402 | 6/1987 | Raufeisen . | |
| 4,722,268 | 2/1988 | Rightley . | |
| 4,835,368 | 5/1989 | Fortmann et al. . | |
| 4,856,422 | 8/1989 | Meister | 219/401 |
| 4,865,814 | 9/1989 | Childress | 422/116 |
| 4,876,426 | 10/1989 | Smith . | |
| 4,891,498 | 1/1990 | Fortmann et al. . | |
| 4,924,072 | 5/1990 | Oslin . | |
| 4,939,987 | 7/1990 | Smith . | |
| 5,025,132 | 6/1991 | Fortmann et al. . | |
| 5,196,165 | 3/1993 | Harrell et al. | 422/116 |

FOREIGN PATENT DOCUMENTS 378223  4/1973  U.S.S.R. ............................ 219/401

Primary Examiner—Bruce A. Reynolds
Assistant Examiner—John A. Jeffery
Attorney, Agent, or Firm—Foley & Lardner

[57] ABSTRACT

A humidity controlled food warmer includes a humidity control for adding moisture to a closed environment. A heater for the enclosure maintains the air temperature within a certain range, for example 1° F., and in this condition the humidity control heating element operates at preselected intervals. When the cabinet is opened and the temperature sensor notes a deviation by another amount, for example 4° F., the heating element of the humidity control is operated continuously until the temperature rises above the deviation temperature and for a preselected time thereafter. A controller measures the amount of time the deviation occurred and the time of humidity generation is related to such amount of time, such as a multiple thereof, but preferably an amount of time not to exceed another preset period of time.

18 Claims, 2 Drawing Sheets

HUMIDITY CONTROLLED FOOD WARMER

BACKGROUND OF THE INVENTION

1. Field of the Invention

The present invention relates generally to food product enclosures which have humidity and temperature control. In the most preferred embodiment, the invention relates to a humidity controlled food warmer wherein the amount of humidity added by a humidity control system is varied depending upon temperature deviations, more particularly upon a sensed relatively large deviation in temperature indicating that, for example, the enclosure has been opened. In the most preferred form of the invention, the controller is adapted to add humidity to the enclosure for a period of time related to the period of time the temperature of the enclosure deviates from a preset temperature by a predetermined amount.

2. Description of Prior Systems For Heating An Enclosure and Providing Humidity Control Several patents have been issued on food treatment/holding devices which include humidity control. One such system is disclosed in U.S. Pat. No. 4,891,498 issued Jan. 2, 1990 to Fortmann, et al. and entitled "Food Treatment Cabinet With Flash Steamer". In this device, a water storage compartment includes a heater and means for delivering a plurality of pulses of water to a heater surface where the water is boiled into an evaporative state. The number of water pulses directed onto the surface is determined by the length of time that a cabinet door is opened. A limit switch in the door is connected to the control circuit to indicate the length of time, and upon sensing of the door being opened, a control circuit is reset resulting in a pulse of water being immediately applied to the heater surface. Much of the patent specification is devoted to a description of the control which includes a cube timer which operates solenoid valves for a preselected time period at preselected intervals. In a first interval, the pulses are added to provide initial moisture to the cabinet. In a second mode of operation, maintenance pulses are used while the door remains closed and in a third mode of operation, the system adds additional moisture, predetermined by a timer which measures the length of time that the door has remained open. In all cases, water is vaporized upon hitting the surface of the heater.

A parent to the aforementioned '498 patent is U.S. Pat. No. 4,835,368 issued May 30, 1989 to Fortmann, et al. and entitled "Food Treatment Cabinet With Flash Steamer". This device adds water to a heater surface capable of vaporizing the liquid as an incidence of the door being opened or closed. In short, this more basic patent utilizes the same humidity control addition system, but without the sophistication of the timer arrangement more specifically set forth in the later patent.

A "Microprocessor Controlled Food Treatment Cabinet With Flash Steamer And Compensating Humidity Control Routines" is described in U.S. Pat. No. 5,025,132 issued Jun. 18, 1991 to Fortmann, et al. This device, like the other Fortmann, et al. devices, uses a heating plate and a solenoid for delivering a plurality of pulses of water against the heater surface depending upon the amount of time that a cabinet door is opened. The operating parameters are controlled in the memory of a microprocessor, with separate and independent control logic for an initial pre-heat mode, as well as for normal operating modes. The patent primarily relates to the use of solid-state equipment to improve upon the relay technology used in the earlier system.

"An Environmental Chamber" is described in Truhan U.S. Pat. No. 3,424,231 issued Jan. 28, 1969. The fluid sump in this device includes heating and cooling coils, and control is provided at the sump for suitable actuation of the coils. Humidity is added to the cabinet by means of a water spray injected into a gas stream to saturate the gas with water at a controlled temperature. A fan then directs the gas through a gas treating chamber into the food containing cabinet. The patent does not disclose techniques for sensing the need for additional humidity.

Other patents involving food-holding chambers with humidity addition include U.S. Pat. No. 4,010,349 issued Mar. 1, 1977 to Lee for "Proofing Cabinet". This patent is directed to an immersion heated water tray in a system which also includes a vertical heater for inducing circulatory flow within the cabinet.

In Roderick, U.S. Pat. No. 4,039,776 issued Aug. 2, 1977 for "Closed Passage Heat Holding Apparatus", the focus is on the circulation system for creating a desired pattern within the cabinet and does not include any system for sensing when changes in the amount of humidity are required.

Another proofing cabinet is described in Allen U.S. Pat. No. 4,373,430 issued Feb. 15, 1983 in which the invention is directed to a self-cleaning mode of operation. The humidity control in this device includes a shallow water pan with a heater capable of vigorously boiling the water.

Another device which discloses control of water addition and temperature is U.S. Pat. No. 4,623,780 issued Nov. 18, 1986 to Shelton for "Collectramatic Food Warmer." Humidity is controlled by controlling the water temperature or by passing moist air over a second heater. This patent also does not include any device for sensing the need for increased humidity when the cabinet is opened.

A "Food Warmer Cabinet Control" is shown in U.S. Pat. No. 4,722,268 issued Feb. 2, 1988 to Rightley. Selective adjustment of temperature and vapor pressure is provided by using a reservoir containing a first heater to provide heat of vaporization and a second heater to heat the air in a chamber. The control means includes regulating the time periods for which energy is supplied to the first and second heaters. The control also provides means for automatically changing the temperature of the first and second heater during at least one occasion in the processing of the food to provide a sequence of different stages of air and water temperature.

A "Method And Apparatus For Water Vapor Control In Convection Ovens" is described in U.S. Pat. No. 4,876,426 issued Oct. 24, 1989 to Smith. Humidity is controlled by spraying jets of hot air over the water surface and, in an alternate embodiment, air is heated to one temperature while water is heated to another temperature and controlled using a thermostat.

Yet another cabinet for controlling humidity is described in U.S. Pat. No. 4,924,072 issued May 8, 1990 to Oslin for "Humidity Control For Oven Chamber". Differences between air and water temperature are sensed in the forced-air convection oven systems or the device can be used as a steamer, depending on control provided by the operator. Wet and dry bulb thermometers in the circulating gas permit the control of relative humidity, whether the oven is used to proof dough or hold cooked food at a relatively low temperature.

Other devices which include a water container and a control for changing humidity and/or in which humidity is sensed by a humidity sensor include U.S. Pat. No. 2,499,525 issued Mar. 7, 1950 to Person for "Dough Raising Box"; U.S. Pat. No. 4,426,923 issued Jan. 24, 1984 to Ohata for "Storage Device For Processed Foods"; U.S. Pat. No. 4,483,243 issued Nov. 20, 1984 to Cote for "Apparatus For Rising Dough"; U.S. Pat. No. 4,939,987 issued Jul. 10, 1990 to Smith for "Humidity Control System"; and U.S. Pat. No. 4,674,402 issued Jul. 23, 1987 to Raufeisen for "Apparatus For Thawing, Retarding And Proofing Bakery Goods".

While all of the foregoing patents mention, in part, certain features of the present invention, they all suffer one or more drawbacks. For example, using a simple time measurement to control humidity or temperature is not suitable in all instances, as ambient conditions can have a dramatic impact on what occurs inside a cabinet when the door thereto is opened. In addition, the amount of door opening may be a significant factor. Other systems which employ simple measurements of humidity and temperature, whether or not interrelated, do not provide the type of control and limits needed for particular containment applications. Accordingly, it would be advantageous to provide a system which maintains the desired humidity level, for a given temperature, and which does so in a controlled manner.

SUMMARY OF THE INVENTION

The present invention features a humidity control for a food warmer which overcomes the above-noted disadvantages of the prior art. The present invention features a humidification system in which a heater is used with a water containment, e.g. an immersion heater. The present invention also features a temperature control system adapted to maintain the temperature within the cabinet within a desirable range during normal operation, i.e. when the cabinet has been preheated and holds the food product. An exemplary preferred range for this mode of operation would be $\pm 1°$ F. During normal operation, the heater may be activated at preselected intervals to maintain a predetermined humidity level.

The present invention also features a system for noting when the temperature within the cabinet departs from the normal operating range by another predetermined amount, e.g. 4° F. and in which a counter is provided for measuring the time that such temperature deviation exists.

Another feature of the present invention is a control system which monitors the length of time that the temperature deviation has been noted and controls the power to the heater for the water container to raise its temperature to add humidity. Such elevated temperature is maintained for a time related to the amount of time noted for the temperature deviation, following which the heater for the water container returns to the normal operating mode.

How the features mentioned above and other features of the invention are accomplished will be described in the following detailed description of the preferred embodiment, taken in conjunction with the Figures. Generally, however, the invention in its most preferred embodiment includes a cabinet having a door, such cabinet being suitable for food products which must be maintained in a warm and moist environment. The cabinet includes a heating system for providing heated air to the cabinet interior and a water reservoir which, in the most preferred embodiment, includes a warning light and cut-off to protect the equipment if the water level falls below a predetermined amount. A pump is provided for conveying water from the reservoir to a substantially smaller capacity heating area which includes an immersion-type heating element. A low water cut-off may also be provided in this portion of the equipment. A humidity control is provided for turning on the immersion heater at predetermined time periods based on parameters which may be established by the operator of the equipment. The air heating control may also be set for a desired temperature and includes normal components for noting the temperature in the cabinet and maintaining it within a first range.

In the most preferred embodiment, the heating system also includes a control mechanism connected with the immersion heater element. Such control determines when the temperature within the cabinet deviates from the preset temperature by another preset amount, typically an amount which would be experienced when the door to the cabinet was open for more than a few seconds. In such circumstance, a counter within the humidity control circuit begins to count the amount of time that the temperature deviation is experienced, while simultaneously turning on the immersion heater. The immersion heater is maintained in an "on" condition until the temperature within the cabinet climbs above the preset deviation temperature, after which the immersion heater continues to operate for a further amount of time which may be selected by the operator but which, in the preferred embodiment, is a multiple of the time the temperature deviation was noted. In normal operation, with the door closed, the heater would operate whenever it was necessary to maintain the temperature at the preset level and the immersion heater would be turned on for a short period of time, at periodic intervals, to maintain a desirable humidity within the cabinet. Other ways in which the features of the invention are accomplished will appear to those skilled in the art after reading the specification. Such other ways are deemed to fall within the scope of the invention.

DESCRIPTION OF THE DRAWINGS

Like reference numerals are used to indicate like components.

DETAILED DESCRIPTION OF THE PREFERRED EMBODIMENT

Figure 1:
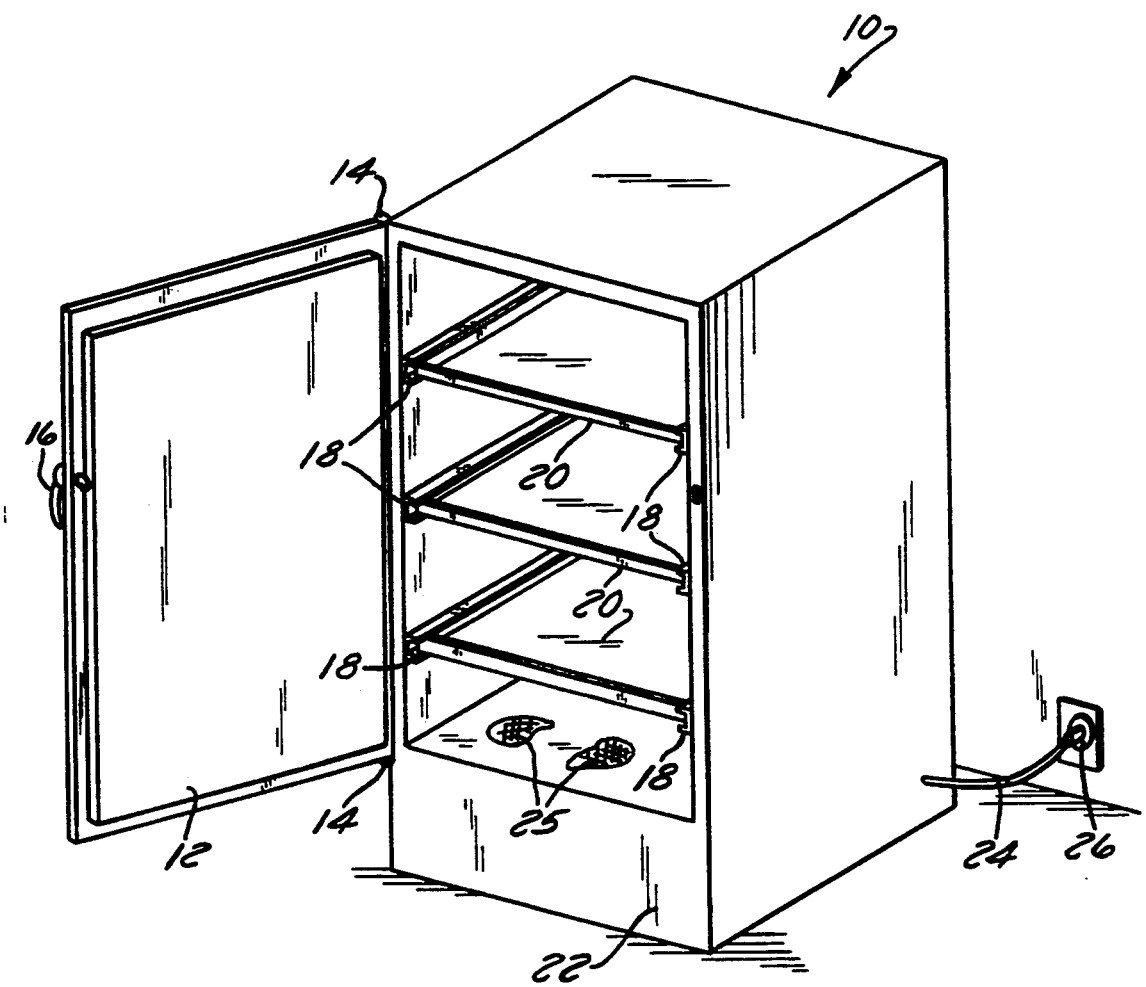
FIG. 1 is a schematic illustration of a humidity controlled food cabinet according to the most preferred form of the present invention.

Before proceeding to a description of the preferred embodiment of the invention, several comments should be made about the applicability of the invention to various food holding applications. First, it should be mentioned that the preferred embodiment will be described in connection with a holding cabinet used to hold fried chicken at a temperature of about 160° F. and a humidity of about 75% RH. The various electrical components, including the air and water heaters, are selected for this application and for a typical fried chicken holding cabinet which will be able to reach normal operating parameters from a cold start, with the door of the cabinet closed, in about 20 minutes, assuming an ambient temperature condition of 71° F. and an ambient relative humidity of about 39% RH.

It will also become apparent from the description of the schematic and from the description of the control systems that certain temperature and time parameters are used in the preferred embodiment. For example, for our prototype chicken holding cabinet, we desire a normal operating temperature fluctuation of ±1° F. In other words, we determined that we wanted the heater to be activated in the event the temperature dropped more than 1° F. from the preset amount. It was also determined for this particular application that the immersion heater would need to be activated for approximately 4 seconds out of every 20 seconds to maintain the humidity at the desired level.

Further, with regard to the preferred embodiment, it was determined that during normal operation the door could be open for a brief amount of time, such as for the removal of one or two pieces of chicken. Where problems have occurred in the prior art, they have typically occurred when the door is open for an extended period, i.e. on the order of 30 seconds or longer. Such periods are common during busy periods in a restaurant or when a tray of product needs to be inserted to replenish an empty tray. We therefore decided that a 4° F. temperature drop would be used to initiate the return-to-normal operations, at which time two separate but interrelated events begin. First, as soon as the temperature deviation reaches or falls below the 4° point, the immersion heater is turned on and maintained on for a time which will discussed later. At the same time, the air heater would continue to operate (it would have been activated upon a 1° F. deviation) until the preset normal operating temperature range is achieved. A counter begins to count the period of time between originally noting the 4° temperature deviation and the time at which the temperature rises above the deviation temperature. The immersion heater continues to operate for a period of time which, in the preferred embodiment, is a multiple of the accumulated time that the temperature was 4° F. or more below the preset normal operating temperature. In our most preferred embodiment, we also build in an upper limit for the humidity generating heat step, e.g. 150 seconds, after the temperature rises above the deviation temperature.

The control system described in the following detailed description permits modification of several variables. For example, the normal operating range, without interruption of the normal immersion heater pattern, could be different than ±1° F. Furthermore, depending on the size of the cabinet, the size of the door, ambient conditions, the nature of the food product and perhaps other variables, the temperature deviation amount might be changed, as well as the multiplier used to return the system to the normal ranges. Accordingly, the following detailed description should be taken as illustrative rather than limiting, and how the system could be varied will become apparent to those skilled in the art after the present specification has been read and understood.

FIG. 1 illustrates in schematic form a food holding cabinet 10 which includes a door 12 mounted on hinges 14 and including a latch-type handle 16 to permit door 12 to be opened and closed when desired. The interior of cabinet 10 includes a plurality of opposed tray-support edges 18 arranged to hold trays 20 of food product (not shown). The base 22 of cabinet 10 includes the heating and humidity control components of the present invention (to be described separately) and outlets 25 within cabinet 10 communicate with such components, e.g. through the side or back walls, as is generally known for such equipment. Power is supplied to cabinet 10 through a power cord 24 coupled to an outlet 26.

The overall arrangement of the main components of the cabinet 10 are similar to those of prior cabinets except for the temperature and humidity control elements which will now be described in connection with FIG. 2.

Figure 2:
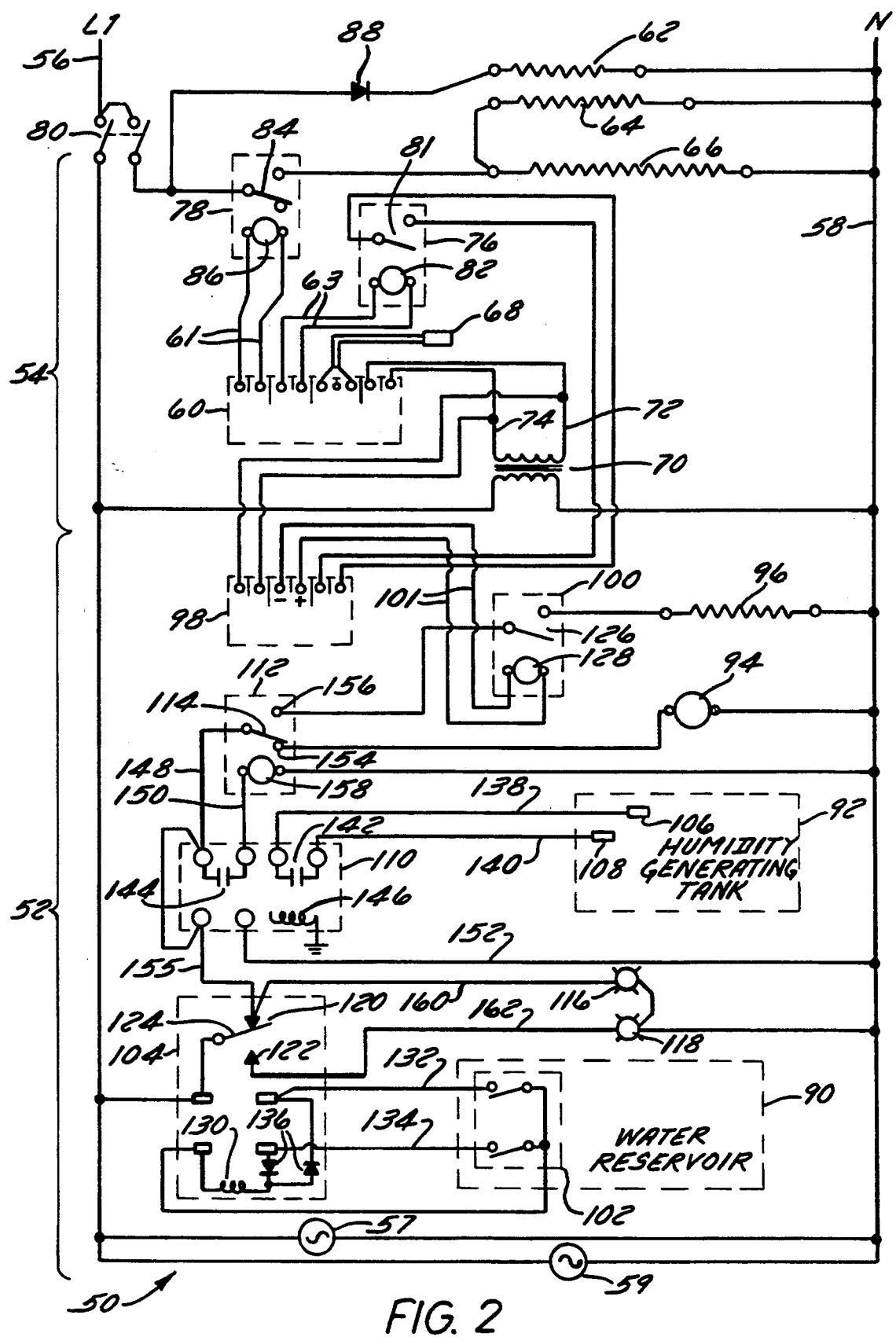
FIG. 2 is an electrical schematic of a control system useful with the device shown in FIGURE I.

FIG. 2 illustrates in electrical schematic form one preferred form of control system 50, generally including a humidity control subsystem 52, a temperature control subsystem 54, and a rocker switch 80. A power supply (not shown) powers the various components of control system 50 by supplying available power, such as 120 volts, across a conductor 56 relative to a second conductor 58. Rocker switch 80 is the ON/OFF switch of control system 50. When rocker switch 80 is closed, the various components of control system 50 are coupled to conductor 56. When rocker switch 80 is open, the circuit between conductor 56 and the components of control system 50 is broken. System 50 further includes a blower 57 and a fan 59.

Temperature control subsystem 54 generally includes a temperature control unit 60, a plurality of heaters 62, 64, and 66, and a temperature sensor 68. Temperature control unit 60 is coupled to and powered by a transformer 70 having a ratio of windings to utilize available power to supply 24 volts across a plurality of conductors 72 and 74. Temperature control unit 60 is further coupled to a relay 76 and a relay 78. In the presently preferred embodiment of the invention, temperature control unit 60 is product model 02-01-063 manufactured by and generally available from Hatco Corporation of Milwaukee, Wis.

Heaters 62, 64, and 66 are respectively a 175 W door perimeter heater, a 50 W cavity base heater, and an 800 W air heater. Heater 62 is coupled to rocker switch 80. Thus, when rocker switch 80 is closed, heater 62 is ON. Heaters 64 and 66 are coupled to rocker switch 80 through relay 78. Thus, when rocker switch 80 is closed, heaters 64 and 66 are powered when a switch 84 of relay 78 is closed.

Relay 78 includes switch 84 and a solenoid 86. The position of switch 84 of relay 78 is controlled by temperature control unit 60 through signals transmitted over a plurality of conductors 61 to solenoid 86. Relay 76 includes a solenoid 82 and a switch 81. The position of switch 81 of relay 76 is controlled by temperature control unit 60 through signals transmitted over a plurality of conductors 63 to solenoid 82. According to the presently preferred embodiment of the invention, relays 76 and 78 are product number 02-01-055 manufactured by and available through Hatco Corporation.

Humidity control subsystem 52 generally comprises a water reservoir 90, a humidity generating tank 92, a pump motor 94, a heating element 96, and a humidity control unit 98. Humidity control unit 98 is coupled to relay 76, and is coupled to and powered by transformer 70 through conductors 72 and 74. Humidity control unit 98 is further coupled to a relay 100. Humidity control unit 98 may comprise analog or digital circuitry to implement the unit's functions, which will be described in greater detail below. In the presently preferred embodiment, humidity control unit 98 is a dual-phase timer circuit. manufactured by and available from CPI, located at 766.7 Cahill Street, Minneapolis, Minn., 55439.

According to the presently preferred embodiment of the invention, heating element 96 is a 600W, 115V immersion heater disposed to heat the water in tank 92. For example, element 96 may be product number 02-05-002 manufactured by and available through Hatco Corporation.

Relay 100 includes a switch 126 and a solenoid 128. The position of switch 126 of relay 100 is controlled by humidity control unit 98 through signals transmitted over a plurality of conductors 101 to solenoid 128. According to the presently preferred embodiment of the invention, relay 100 is product number 02-01-055 manufactured by and available through Hatco Corporation.

Water reservoir 90 contains a level switch 102 which is coupled to a latching relay 104 through a plurality of conductors, 132 and 134. Level switch 102 is configured to couple conductors 132 and 134 when the water level of reservoir 90 is at or above a predetermined level, and decouple conductors 132 and 134 when the water level of reservoir 90 is below the predetermined level. According to the presently preferred embodiment of the invention, water reservoir 90 is a two and one fourth gallon tank, and level switch 102 is product number 02-01-029 manufactured by and generally available from Hatco Corporation.

Latching relay 104 includes a contact arm 124, a plurality of contacts 120 and 122, an inductor 130, and a plurality of diodes 136. Latching relay is coupled to level switch 102 through conductors 132 and 134. Latching relay is configured to couple arm 124 to contact 120 when conductors 132 and 134 are coupled through switch 102, and to couple arm 124 to contact 122 when conductors 132 and 134 are not coupled through switch 102. Latching relay 104 is product number 02-01-028 manufactured by and generally available from Hatco Corporation.

Humidity generating tank 92 contains a plurality of probes 106 and 108 which are coupled to a tank monitoring circuit 110 through a plurality of conductors 138 and 140. In the presently preferred embodiment of the invention, tank 92 has a capacity between twelve ounces and one cup, and tank monitoring circuit 110 is product number 02-01-005 manufactured by and generally available from Hatco Corporation.

Tank monitoring circuit 110 includes a plurality of capacitors 142 and 144, and an inductor 146. Capacitor 142 is coupled to probes 106 and 108 through conductors 138 and 140. One plate of capacitor 142 is coupled to inductor 146, which is tied to ground. Capacitor 144 is coupled to a relay 112 through a plurality of conductors, 148 and 150. Tank monitoring circuit 110 is further coupled to conductor 58 through a conductor 152 and to contact 120 through a conductor 155.

Pump Motor 94 is coupled to conductor 58 and a contact 154 in relay 112. Motor 94 drives a pump (not shown) which pumps water from reservoir 90 to tank 92. In the presently preferred embodiment, pump motor 94 is a seventy watt motor.

Relay 112 includes contact 154, a second contact 156, a solenoid 158, and a contact arm 114. The position of contact arm 114 of relay 112 is controlled by tank monitoring control circuit 110 through signals transmitted over conductor 150 to solenoid 158. Contact 156 is coupled to switch 126 of relay 100. Relay 112 is preferably product number 02-01-027 manufactured by and generally available from Hatco Corporation.

Humidity control subsystem 52 further includes a plurality of indicator lights 116 and 118. Light 116 is coupled to contact 120 through a conductor 160, and light 118 is coupled to contact 122 through a conductor 162. Lights 116 and 118 are further coupled to conductor 58. In the preferred embodiment of the invention, light 118 is red and indicates a low water condition, and light 116 is green.

A detailed description of the operation of control system 50 will now be given. Under normal operating conditions, rocker switch 80 is closed, thus coupling blower 57, fan 59, heater 62, and transformer 70 to conductor 56. Transformer 70 supplies power to both temperature control unit 60 and humidity control unit 98.

Level switch 102 is disposed within reservoir 90 and configured to decouple conductor 132 and 134 when the water level of reservoir 90 falls below a predetermined level. When the circuit formed by conductors 132 and 134 through switch 102 is broken, latching relay 104 connects arm 124 with contact 122. This action completes the circuit between conductor 56 and conductor 58 through light 118, causing light 118 to go ON, providing indicia of a low water level. This action also breaks the connection between arm 124 and contact 120, thus opening the circuit between conductor 56 and light 116, and between conductor 56 and those components connected to contact 120 through tank monitoring circuit 110 and relay 112.

When the water level in reservoir 90 is at or above the predetermined level, switch 102 connects conductors 132 and 134, causing contact arm 124 of latching relay 104 to engage contact 120. Conductors 155 and 152, which are coupled to contact 120, are thus coupled to conductor 56. This completes the circuit between conductors 56 and 58 through light 116, causing light 116 to go ON, giving indicia of an adequate water level.

Probe 106 is located above probe 108 in tank 92. When tank 92 is filled with water at or above the level of probe 106, the water electrically couples probes 106 and 108. When probes 106 and 108 are thus coupled, tank monitoring circuit 110 causes arm 114 to engage contact 156. When the water level of tank 92 is below the level of probe 106, tank monitoring circuit 110 causes arm 114 to engage contact 154. The engagement of arm 114 with contact 154 will complete the circuit between conductor 56 and conductor 58 through motor 94, causing motor 94 to turn ON. While activated, motor 94 will pump water from reservoir 90 to tank 92. Contact arm 114 will remain engaged with contact 154, and therefore motor 94 will remain activated, until the water in tank 92 rises to the level of probe 106. When the water reaches this level, the circuit between probes 106 and 108 is closed and contact arm 114 disengages from contact 154 to engage contact 156.

Temperature control unit 60 monitors sensor 68, which is disposed to sense the temperature within a food holding cabinet. If the temperature monitored is within a first predetermined range of a predetermined temperature setting, switch 84 of relay 78 remains open. If, however, the temperature falls outside the first predetermined range, temperature control unit 60 causes switch 84 to close. While switch 84 is closed, power is supplied to heaters 64 and 66, causing the temperature within the cabinet to increase. Switch 84 remains closed until the cabinet temperature, as monitored by temperature control unit 60 through sensor 68, returns within the first predetermined range.

If the temperature within the cabinet falls outside a second predetermined range of the temperature setting, temperature control unit 60 causes switch 81 to close. The closure of switch 81 is sensed by humidity control unit 98 which responds by closing switch 126. At the closure of switch 81, humidity control unit 98 also begins to increment a counter.

The activation of relay 100 couples heating element 96 to relay 112. If both tank 92 and reservoir 90 contain adequate levels of water, as discussed above, arm 114 of relay 112 will connect element 96 to conductor 56 through tank monitoring circuit 110 and latching relay 104, causing element 96 to receive power. Thus, element 96 will begin to heat the water in tank 92. As the water in tank 92 heats, some of it is converted to water vapor, thereby increasing the humidity inside the cabinet.

When the temperature monitored by temperature control unit 60 through sensor 68 returns within the second predetermined range, temperature control unit 60 opens switch 81. The opening of switch 81 is sensed by humidity control unit 98, which begins to decrement the counter. Humidity control unit 98 maintains switch 126 closed while the counter decrements. Switch 126 is finally opened, deactivating element 96, when the counter returns to zero. Thus, when the temperature within the cabinet returns to the second predetermined range, element 96 continues to heat the water in tank 92 for a time period dependent on the duration of the temperature deviation.

The ratio between the counter's increment and decrement intervals may vary. In the presently preferred embodiment of the invention, the counter is configured to take four times as long to decrement as it does to increment. Thus, if the counter increments during a temperature deviation of ten seconds, it will decrement for forty seconds. However, in the presently preferred invention, the counter has a predetermined maximum value. Thus, if the duration of temperature deviation is longer than the period for the timer to reach its maximum value, the duration of the subsequent countdown will be determined by the maximum value. The presently preferred maximum counter value allows for a maximum countdown period of 150 seconds.

During normal operation, when rocker switch 80 is closed, both tank 92 and reservoir 90 have adequate water levels, and the temperature within the cabinet is within the second predetermined range, humidity control unit 98 closes switch 126 at regular intervals for a predetermined duration. For example, in the preferred embodiment, humidity control unit 98 closes switch 126 to activate element 96 for four seconds during every twenty second period. This periodic heating of element 96 helps to maintain the humidity within the cabinet at a desired level.

The operation of the present invention has been generally described above in connection with the introduction and in connection with FIG. 2, and it should now be apparent how the variables can be adjusted for equipment of various sizes and/or for food products having different characteristics with respect to desired temperature and humidity holding parameters. For example, pizza, chicken and bakery products would each have a different set of parameters, especially with respect to normal operating ranges. Moreover, while the humidity addition step has been described as being related to the time the temperature remains below the pre-established drop amount, it could also be related to the amount of time required for the cabinet to return from the drop temperature to the temperature range established for normal operation. Accordingly, while the invention has been described in connection with a preferred and illustrated embodiment, its scope is not intended to be limited thereby but is to be limited only by the scope of the claims appended hereto.

What is claimed is:

1. A temperature and humidity controlled food-containing cabinet comprising:

a cabinet interior having an access opening which may be opened and closed;

means within the cabinet interior for supporting food;

a closure for the access opening;

a first heater for warming the air within the cabinet interior;

a second heater for heating a liquid to cause at least some of the liquid to evaporate into the air within the cabinet interior, thereby increasing the humidity within the cabinet interior;

means for sensing the air temperature within the cabinet;

first control means, operatively connected with the sensing means and with the first heater, for maintaining the air temperature within the cabinet within a set of preselected parameters, the set of preselected parameters including a preselected temperature parameter, the first control means being configured to sense a predetermined drop in the air temperature within the cabinet when compared to the preselected temperature parameter, the first control means being further configured to generate a drop indicating signal to indicate the occurrence of said predetermined drop; and second control means, operatively connected with the first control means and the second heater, for receiving the drop indicating signal and for energizing the second heater responsive to receipt of the drop indicating signal, whereby humidity within the cabinet is increased responsive to the occurrence of the predetermined drop in temperature.

2. The cabinet of claim 1 wherein the first control means is further configured to activate the first heater responsive to the temperature within the cabinet falling below the preselected temperature parameter.

3. The cabinet of claim 1 wherein the second control means further comprises means for determining a first duration indicative of the duration of the predetermined drop in temperature.

4. The cabinet of claim 3 wherein the second heater is coupled to the duration determining means and wherein the second control means activates the second heater for a second duration, the second duration being related to the first duration.

5. The cabinet of claim 4 wherein the second duration equals the first duration multiplied by a constant, the constant being greater than one.

6. The cabinet of claim 5 wherein the second control means limits the second duration to a maximum time period.

7. The cabinet of claim 1 wherein a third control means is provided to activate the second heater periodically at predetermined intervals and for a predetermined amount of time.

8. The cabinet of claim 1 including means for changing the set of parameters and the predetermined temperature drop.

9. The cabinet of claim 6 including means for changing the constant and the maximum time period.

10. A method for controlling the humidity and temperature in a food-containing cabinet according to a predetermined set of parameters, comprising the steps of:
  sensing when the temperature within the cabinet drops below a temperature parameter of the predetermined set of parameters;
  activating a first heater disposed to heat the air within the cabinet in response to sensing the temperature within the cabinet drop below the temperature parameter;
  sensing when the temperature within the cabinet drops below the temperature parameter by a preselected amount;
  activating a moisture generator to evaporate a liquid in the cabinet in response to sensing the temperature within the cabinet drop below the temperature parameter by the preselected amount; and
  the method comprising the further step of measuring the amount of time the temperature in the cabinet drops below the temperature parameter by the preselected amount.

11. The method of claim 10 comprising the further step of periodically activating the moisture generator when the temperature within the cabinet is within a predetermined temperature range specified by the predetermined set of parameters.

12. The method of claim 1 comprising the further step of maintaining the moisture generator in an activated condition for a time related to the amount of time measured.

13. The method of claim 12 wherein the time of activation equals the amount of time measured multiplied by a constant, the constant being greater than one.

14. The method of claim 10 wherein the predetermined set of parameters includes a preset specific temperature and a range of ±1° F. above and below same.

15. The method of claim 10 wherein the preselected amount is 4° F. or more.

16. A temperature and humidity controlled cabinet of the type including a cabinet interior, an access door, a heater for warming the interior of the cabinet, a water container containing water and a water heater for heating the water in the water container to add humidity to the air enclosed within the cabinet, the improvement comprising a control system for maintaining the temperature and humidity within the cabinet within a set of operating parameters during periods when the access door remains closed or is open for short periods of time and for returning the temperature and humidity to within the set of operating parameters when the access door is opened for a longer period of time, the control system including:
  a temperature sensor coupled to the heater to activate the heater responsive to the temperature in the cabinet falling below a temperature established in the set of parameters;
  means for detecting when the temperature within the cabinet drops a predetermined amount below the temperature, the detecting means coupled to the water heater to activate the same responsive to such a temperature drop;
  means for measuring the amount of time of such temperature drop and for continuing to maintain the water heater in an activated state for a time related to and greater than the measured time, whereby the water heater remains in an activated state after the temperature in the cabinet rises above the predetermined amount below the temperature.

17. The cabinet of claim 16 wherein the water heater is activated for a period of time which is a multiple of the amount of time the temperature drop was detected.

18. The cabinet of claim 17 wherein means are provided for limiting the activated state time for the water heater after the temperature of the cabinet rises above the temperature drop point required to activate the water heater.

* * * * *